United States Patent
Sorbel (10) Patent No.: US 11,373,631 B2
(45) Date of Patent: Jun. 28, 2022

(54) ADVANCED ACOUSTIC BIDIRECTIONAL REFLECTANCE DISTRIBUTION FUNCTION MEASUREMENT DEVICE

(71) Applicant: Raytheon Company, Waltham, MA (US)

(72) Inventor: Scott R. Sorbel, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 135 days.

(21) Appl. No.: 16/896,306

(22) Filed: Jun. 9, 2020

(65) Prior Publication Data

US 2021/0383787 A1    Dec. 9, 2021

(51) Int. Cl.
| | |
|---|---|
| *G01N 29/22* | (2006.01) |
| *G10K 11/28* | (2006.01) |
| *G10K 11/32* | (2006.01) |

(52) U.S. Cl.
CPC ........... *G10K 11/28* (2013.01); *G01N 29/223* (2013.01); *G10K 11/32* (2013.01); *G01N 2291/045* (2013.01)

(58) Field of Classification Search
CPC ........ G10K 11/28; G10K 11/02; G10K 11/04; G10K 11/05; G10K 11/11; G10K 11/32; G10K 2210/3223; G01N 29/223; G01N 2291/045
See application file for complete search history.

(56) References Cited

U.S. PATENT DOCUMENTS

| | | | | |
|---|---|---|---|---|
| 11,030,865 | B1* | 6/2021 | Di Luca | G06F 3/014 |
| 2014/0355381 | A1* | 12/2014 | Lal | G06K 9/0002 |
| | | | | 367/87 |
| 2016/0242736 | A1* | 8/2016 | Freiburg | A61B 8/14 |
| 2019/0306649 | A1* | 10/2019 | Giron | G01S 15/89 |

OTHER PUBLICATIONS

Brown, W. M.; Synthetic Aperture Radar; IEEE T Aero Elec Sys Aes3, 217 (1967).
Ding et al.; Ultrathin Pancharatnam-Berry Metasurface with Maximal Cross-Polarization Efficiency; Adv Mater 27, 1195-1200; 2015.
Engheta et al.; Metamaterials: physics and engineering explorations; Wiley-Interscience; 2006.
(Continued)

*Primary Examiner* — Suman K Nath
(74) *Attorney, Agent, or Firm* — Renner, Otto, Boisselle & Sklar, LLP (57) ABSTRACT

An acoustic bidirectional reflectance distribution function (BRDF) measurement system utilizing metamaterials and compressive sensing for measuring scattering acoustic profiles (e.g., over large angular regions, such as hemispherical scattering/emitting into two π steradians or even spherical scattering/emitting over four π steradians). The measurement system includes one or more acoustic waveguides having a curved receiving surface and made from an acoustic metamaterial configured to encode as a sound signal a frequency and directionality of a sound input received from a sample. Each acoustic waveguide includes an acoustic sensor for detecting the encoded sound signal from the metamaterial.

20 Claims, 5 Drawing Sheets

(56) References Cited

OTHER PUBLICATIONS

Fenn et al.; The development of phased-array radar technology; Lincoln Laboratory Journal 12, 321-340; 2000.

Fromenteze et al.; Computational imaging using a mode-mixing cavity at microwave frequencies; Appl Phys Lett 106; 2015.

Gollub, et.al.; "Large Metasurface Aperture for Millimeter Wave Computational Imaging at the Human-Scale"; Scientific Reports, 7:42650; 2017.

Holloway et al.; An Overview of the Theory and Applications of Metasurfaces: The Two-Dimensional Equivalents of Metamaterials; IEEE Antenn Propag M 54, 10-35; 2012.

Hunt et al.; Metamaterial Apertures for Computational Imaging; Science 339, pp. 310-313; 2013.

Imani et al.; Analytical modeling of printed metasurface cavities for computational imaging. Journal of Applied Physics 120, 144903; 2016.

Lipworth, et.al.; "Comprehensive Simulation platform for a metamaterial imaging system"; vol. 54, No. 31; Nov. 1, 2015; Applied Optics.

Liu et al.; A comparison of truncated total least squares with Tikhonov regularization in imaging by ultrasound inverse scattering; Phys Med Biol 48, 2437-2451; 2003.

Marks et al.; Spatially resolving antenna arrays using frequency diversity; JOSA A 33, 899-912; 2016.

Skolnik; M. I. Radar handbook 3rd edn; McGraw-Hill, 2008; Summary PDF.

Yurduseven et al.; Microwave Imaging with Arrays of Planar Cavities; IET Microwaves, Antennas & Propagation 10, 1174-1181; 2016.

Yurduseven et al.; Printed Aperiodic Cavity for Computational and Microwave Imaging. IEEE Microw Wirel Co 26, 367-369; 2016.

Yurduseven et al.; Resolution of the Frequency Diverse Metamaterial Aperture Imager. Prog Electromagn Res 150, 97-107; 2015.

Yurduseven et al.; Frequency-diverse microwave imaging using planar Mills-Cross cavity apertures; Opt. Express 24, 8907-8925; 2016.

* cited by examiner

ADVANCED ACOUSTIC BIDIRECTIONAL REFLECTANCE DISTRIBUTION FUNCTION MEASUREMENT DEVICE

TECHNICAL FIELD

The present disclosure relates generally to measuring the acoustic response of materials and more particularly to measuring bidirectional reflectance distribution function (BRDF) in the acoustic regime.

BACKGROUND

Advanced development of acoustic materials allows one to control sound at will with unprecedented spatial and frequency performance. To measure the acoustic property of such materials, different measurement systems can be used to measure the direct hemispherical reflectance (DHR) or bidirectional reflectance distribution function (BRDF) of the material. Such measurement systems typically consist of either an anechoic chamber with a moving microphone that takes much time to measure, or a multi-microphone system that does not capture the full acoustic BRDF properly in terms of spatial fidelity.

SUMMARY

A device is needed that mimics the selective listening and sound separation capabilities of human auditory systems in a measurement device that measures angular performance of coupon reflectivity (or an anisotropic sound source) that includes diffuse and specular acoustic components.

In a general embodiment, a measurement system utilizing metamaterials and compressive sensing is provided that measures diffuse omnidirectional (and non-omnidirectional) scattering acoustic profiles regardless of incident angle (and/or sound source) in a bidirectional reflectance distribution function (BRDF) measurement system. This system can measure audio sources directly (active listening) or reflection from an imaging sound wave.

The measurement system uses acoustic waveguides having a passive metamaterial structure that modulates sound input to encode a sound signal that is detected by acoustic sensors. The measurement system can selectively acquire spatially and temporally complex acoustic sources and BRDF reflection profiles using only a single acoustic sensor for each acoustic waveguide of the measurement system.

According to one aspect, an acoustic waveguide is provided. The acoustic waveguide includes an acoustic waveguide and an acoustic sensor. The acoustic metamaterial has a curved receiving surface and is configured to encode a frequency and directionality of a sound input received from a sample to produce an encoded sound signal. The acoustic sensor is operatively coupled to the acoustic metamaterial and is configured to detect the encoded sound signal and output a signal based on the detected encoded sound signal.

Alternatively or additionally, the acoustic sensor is in physical contact with the acoustic metamaterial.

Alternatively or additionally, the acoustic metamaterial encodes the sound input as the encoded sound signal by shifting a property of the sound input based on a location on the acoustic waveguide where the sound input was received. The property is at least one of a frequency, a phase, or an amplitude of the encoded signal.

Alternatively or additionally, the property includes the frequency.

Alternatively or additionally, the acoustic metamaterial is further configured to generate sound, such that the generated sound interacts with the sample and is received as the sound input by the acoustic metamaterial.

Alternatively or additionally, the acoustic waveguide in combination with additional acoustic waveguides as part of a measurement system. The acoustic waveguide and the additional acoustic waveguides are arranged, such that the receiving surfaces of the acoustic waveguide and the additional acoustic waveguides form at least a portion of a hemispherical shape.

Alternatively or additionally, the acoustic waveguide in combination with a sound source positioned outside of the helispherical shape such that sound generated by the sound source interacts with the sample and is received as the sound input by at least one of the acoustic waveguide and the additional acoustic waveguides.

Alternatively or additionally, the acoustic waveguide and the additional acoustic waveguides are arranged such that at least two neighboring acoustic waveguides of the acoustic waveguide and the additional acoustic waveguides are physically separated by an opening. The sound source is positioned outside of the hemispherical shape, such that the sound generated by the sound source passes through the opening before interacting with the sample.

Alternatively or additionally, the acoustic waveguide and the additional acoustic waveguides includes at least two sets of neighboring acoustic waveguides, each set of neighboring acoustic waveguides including two acoustic waveguides in physical contact with one another.

Alternatively or additionally, the receiving surface of the acoustic waveguide and the additional acoustic waveguides form an entirety of the hemispherical shape and the hemispherical shape has at most one opening.

Alternatively or additionally, further including circuitry configured to receive the signal output from the acoustic sensor of each of the acoustic waveguides.

Alternatively or additionally, the circuitry is further configured to apply a transform to each of the received output signals to determine the frequency and the directionality of the sound input received by the acoustic waveguide that resulted in the received output signal.

According to another aspect, a measurement system is provided. The measurement system includes a plurality of acoustic waveguides. The plurality of acoustic waveguides each include an acoustic metamaterial having a curved receiving surface and being configured to encode a frequency and directionality of a sound input received from a sample to produce an encoded sound signal. Each of the acoustic waveguides also includes an acoustic sensor operatively coupled to the acoustic metamaterial and configured to detect the encoded sound signal and output a signal based on the detected encoded sound signal. The acoustic waveguides are arranged, such that the receiving surfaces of the plurality of acoustic waveguides form at least a portion of a hemispherical shape.

Alternatively or additionally, the acoustic metamaterial encodes the sound input as the encoded sound signal by shifting a property of the sound input based on a location on the acoustic waveguide where the sound input was received. The property is at least one of a frequency, a phase, or an amplitude of the encoded signal.

According to another aspect, a method for measuring a bidirectional reflectance distribution function (BRDF) is provided. The method receives a sound input from a sample using an acoustic waveguide made from an acoustic metamaterial having a curved receiving surface. A frequency and directionality of the received sound input is encoded as an encoded sound signal. The encoded sound signal is detected using an acoustic sensor operatively coupled to the acoustic metamaterial. A signal from the acoustic sensor is output based on the encoded sound signal.

Alternatively or additionally, the acoustic metamaterial encodes the sound input as the encoded sound signal by shifting a property of the sound input based on a location on the acoustic waveguide where the sound input was received. The property is at least one of a frequency, a phase, or an amplitude of the encoded signal.

Alternatively or additionally, the property includes the frequency.

Alternatively or additionally, applying a transform to the received output signal to determine the frequency and the directionality of the sound input received by the acoustic waveguide that resulted in the received output signal.

Alternatively or additionally, determining the transform by: receiving a known sound input having known frequency and directionality; and determining the transform that converts the signal output to the known sound input.

Alternatively or additionally, directing sound generated by a sound source onto the sample and altering the generated sound by the sample to create the sound input that is received using the acoustic waveguide.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

Acoustic metamaterials are a class of engineered materials that can be configured to have extraordinary effective properties not normally found in nature. Metamaterials (in either homogeneous or multi-layer laminate form) can offer high anisotropic behavior, large nonlinearities, or negative dynamic parameters while in a dynamic state, such as density, bulk modulus, or refractive index.

When a material undergoes mechanical deformation, it typically responds in a linear manner. But when an input perturbation is time varying a material's response changes when dynamic behavior is introduced in the form of phase and amplitude as shown in Equations 1 and 2:

$$B = -V \frac{\partial P}{\partial V} \qquad \text{Equation 1}$$

$$\rho = \frac{1}{V} \frac{F}{a} \qquad \text{Equation 2}$$

where B is defined as the effective bulk modulus, V is defined as the volume, P as the pressure, ρ as the effective density, F as the applied force, and "a" as the acceleration.

Because information travels over a finite time period (no matter how small), there will always be some phase lag due to the material taking time to react. This directly effects the Sound Transmission (ST) and Sound Transmission Loss (STL) shown in Equations 3 and 4 below, where "m" is defined as the effective mass, "f" as the frequency, and "t" as the thickness of the material.

$$ST = \frac{1}{mft} \qquad \text{Equation 3}$$

$$STL \propto \frac{1}{ST} \qquad \text{Equation 4}$$

Figures 1, 3:
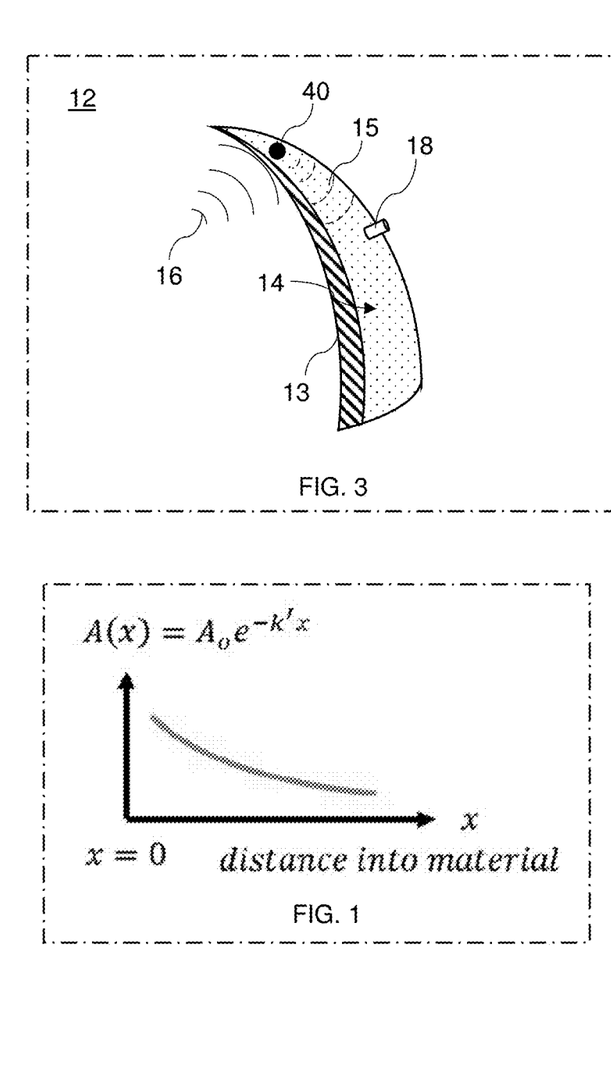
FIG. 1 is a plot showing amplitude reduction into an acoustic metamaterial designed for maximum reflection (minimal transmission).
FIG. 3 shows one of the acoustic waveguides from FIG. 2.

Through the combination of two or more materials, low frequency reflection behavior may be demonstrated that is useful for reflecting the broadband sound at various places in the system. The index of refraction of the highly reflective metamaterial is found with the amplitude derivation to show how the material reduces amplitude of signals being transmitted through the structure according to Equations 5 and 6 below and as shown in FIG. 1.

$$n_{eff} = c\sqrt{\frac{\rho_{eff}}{B_{eff}}} \quad \text{Equation 5}$$

if $\rho_{eff} < 0$ $$-\rho_{eff} = \rho'_{eff}$$

$$n_{eff} = c\sqrt{\frac{-\rho'_{eff}}{B_{eff}}} = ic\sqrt{\frac{\rho'_{eff}}{B_{eff}}}$$

$$A(x, t) = A_o e^{i(kx-\omega t)} \lim_{t \to 0} \quad \text{Equation 6}$$

$$\frac{A(x)}{A_o} = e^{ikx} = e^{i(\frac{2\pi}{\lambda}n_{eff})x} = e^{i\left(\frac{2\pi}{\lambda}ic\sqrt{\frac{\rho'_{eff}}{B_{eff}}}\right)x} = e^{i2(\frac{2\pi}{\lambda}n'_{eff})x} = e^{-k'x}$$

In addition to maximum reflection, one may configure acoustic metamaterials to encode independent acoustic signals coming from different spatial locations. This is done by creating dispersive (frequency-dependent) and inhomogeneous (spatially complex) modes. This physical encoding scheme utilizes multiple degrees of freedom in the spatial and temporal domain of the media which contains complex terms.

By utilizing acoustic waveguides made from acoustic metamaterials, a hardware-based computational sensing method is provided that more effectively decomposes signals of interest due to manufacturing simplicity (e.g., via additively manufacturing techniques), passivity (e.g., no required energy input), and fewer resources needed for similar acoustic sensing performance due to the frequency-dependent filtering mechanism of the acoustic metamaterial structures that the acoustic waveguide is made from.

Acoustic waveguides made from acoustic metamaterials allows for the use of fewer acoustic sensors to obtain a full $2\pi$ acoustic BRDF. For example, instead of needing hundreds of microphones to capture a $2\pi$ acoustic BRDF with somewhat course fidelity (e.g., 25 mm (1 inch) or greater), the acoustic waveguides provided herein allow for a full $2\pi$ acoustic BRDF to be captured with higher spatial fidelity (e.g., 3 mm (⅛ of an inch)).

Figure 2:
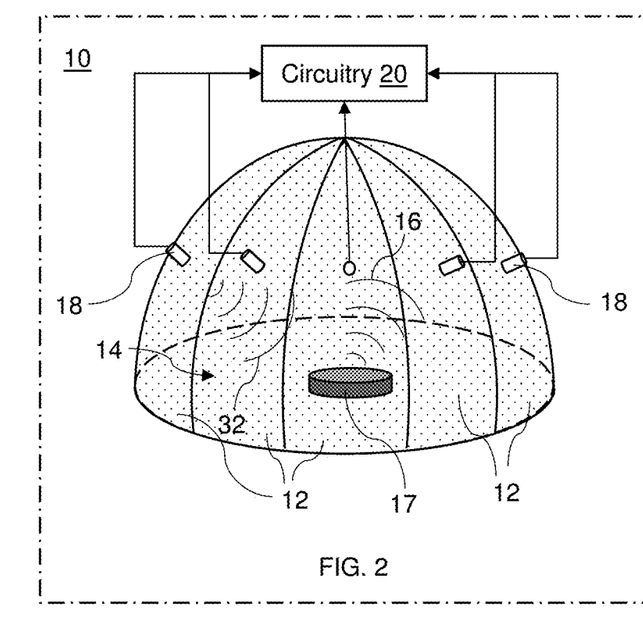
FIG. 2 is a schematic diagram of an exemplary measurement system formed from multiple acoustic waveguides.

Turning to FIG. 2, in a general embodiment, a bidirectional reflectance distribution function (BRDF) measurement system 10 is shown. The measurement system 10 utilizes metamaterials and compressive sensing for measuring scattering acoustic profiles. The measurement system 10 includes one or more acoustic waveguides 12 having a curved receiving surface 13 and made from an acoustic metamaterial 14 configured to encode as a sound signal 15 a frequency and directionality of a sound input 16 received from a sample 17. Each acoustic waveguide 12 includes an acoustic sensor 18 for detecting the encoded sound signal 15 from the metamaterial 14.

The metamaterial 14 is made from sub-wavelength structures that allow for the control of wave physics. This control may be in the form of changing the wave direction (refraction, typically with the real part of a material parameter) or in attenuation (absorption, typically with the imaginary part of a material parameter).

The metamaterials 14 are made from assemblies of multiple sub-wavelength (e.g. $\lambda/8$ to $\lambda/30$) elements fashioned from composite materials such as metals and plastics. The materials may be arranged in repeating and non-repeated patterns at scales that are smaller than the wavelengths of the phenomena they influence. The metamaterials 14 acquire their properties not from the properties of the base materials, but from their newly designed structures with effective properties at a larger scale (typically macro-scale level). By controlling the shape, geometry, size, orientation and placement of the metamaterial 14, acoustic, electromagnetic, or other type of waves may be controlled. This control is accomplished by blocking, absorbing, enhancing, or bending waves that achieve characteristics not normally possible with conventional materials.

Each acoustic waveguide 12 may be created using engineered metamaterial cell properties. Each metamaterial unit cell has a dispersive frequency modulation and is produced by an array of Helmholtz resonators whereby the depths determine their resonating frequencies.

Assuming the resonances in the acoustic metamaterial 14 of each acoustic waveguide 12 (also referred to as a panel) are distributed sparsely over the interested frequency range and only first-order filtering responses dominate, the overall frequency modulation of a waveguide 12 can be approximated by the multiplication of the individual responses of the resonators as shown in Equation 7:

$$T_i(\omega) = \prod_j T_{ij}(\omega) \quad \text{Equation 7}$$

For a source located at $r_k$, the frequency response can be derived by propagating the waveguide responses from each waveguide aperture $r_i$ to the source location as shown in Equation 8:

$$\vec{r}_k : P_C(\omega, \vec{r}_k, S_0) = a(\omega)S_0(\omega)\sum_{i=1}^{36} G(\omega, \vec{r}_i, \vec{r}_k)T_i(\omega)R(\omega, \vec{r}_i, \vec{r}_k) \quad \text{Equation 8}$$

where $S_0(\omega)$ is the spectrum of the audio signal from the source, $R(\omega,r_i,r_k)$ is the waveguide radiation pattern which is predominantly determined by the shape of the waveguide aperture and Equation 9.

$$G(\omega, \vec{r}_i, \vec{r}_k) = e^{-jk|\vec{r}_i - \vec{r}_k|}/|\vec{r}_i - \vec{r}_k| \quad \text{Equation 9:}$$

Equation 9 is the Green's function from the location r of the aperture of the ith waveguide to the location $r_k$. The coefficient $a(\omega)$ includes all other factors such as sensor and speaker responses that are uniform for different source locations and audio signals. Each column of the measurement matrix shown in Equation 10 represents the discretized Fourier components of a source emitting an audio message from the predefined library from one of the possible locations in the scene. The number of columns of the matrix is $N=K \times P$, where K is the number of possible locations and P is the size of the audio library.

$$H = \begin{bmatrix} h_{11} & h_{12} & \ldots & h_{1N} \\ h_{21} & h_{22} & \ldots & h_{2N} \\ \vdots & \vdots & \ddots & \vdots \\ h_{M1} & h_{M2} & \ldots & h_{MN} \end{bmatrix} \quad \text{Equation 10}$$

An element in the measurement matrix can be expressed as follows using Equation 11:

$$h_{mn} = P_c(\omega_m, \vec{r}_k, S_p) = \quad \text{Equation 11}$$

-continued $$a(\omega_m)S_p(\omega_m) \times \sum_{i=1}^{36} G(\omega_m, \vec{r}_i, \vec{r}_k)T_i(\omega_m)R(\omega_m, \vec{r}_i, \vec{r}_k).$$

Each row $H_m$ of the measurement matrix represents a test function for the object vector at one frequency, because a measurement value in the measured data vector is sampled in the way defined by the test function as $g_m = <f, H_m>$, where the angle bracket indicates the inner product. The randomization of the measurement matrix for this sensing system is contributed by the waveguide responses $T_i(\omega)$.

In FIG. 2 (as well as in FIGS. 4 and 5), the external surface of the measurement system 10 is shown partially transparent so that the sample 17 located at a central point of the system 10 is visible. In FIG. 3, an acoustic waveguide 12 from the measurement system 10 of FIG. 2 is shown with a location 40 identified that the sound input 16 interacts with the metamaterial 14. In the embodiment shown in FIGS. 2 and 3, the depicted measurement system 10 is capable of measuring full 2π spatial and temporal effects of isolated sound sources or Bi-Reflection Coupon characteristics. In FIG. 2, the measurement system 10 has a hemispherical shape formed from multiple acoustic waveguides 12.

Each acoustic waveguide 12 (also referred to as a slice) is made of a metamaterial 14 that guides received acoustic energy 16 (also referred to as the sound input signal) into an acoustic sensor 18. In the depicted embodiment, each acoustic waveguide 12 is capable of measuring 0° to 90° in elevation of acoustic spatial energy. For example, the measurement system 10 may include 18 to 72 acoustic waveguides 12. The sample 17 (e.g., a single coupon in reflectance mode or a sound source) is located at the center of the measurement system 10, such that the sample is surrounded by the acoustic waveguides 12 covers 360° of azimuths.

As described above, each acoustic waveguide 12 may include a single acoustic sensor 18. As shown in FIG. 3, the acoustic sensor 18 may be in physical contact with the metamaterial 14. Alternatively, a bridging material may be placed between the metamaterial 14 and the acoustic sensor 18. The bridging material may be used to improve coupling between the metamaterial 14 and the acoustic sensor 18.

The acoustic sensor 18 may take the form of any suitable device for detecting sound and generating a corresponding electrical signal. For example, the acoustic sensor may be a microphone sensitive to sound signals having a frequency of 20 Hz to 20 kHz.

In the depicted embodiment, each acoustic waveguide 12 has a unique and highly frequency-dependent response that is generated by the resonators (formed by the metamaterial 14) having randomly selected resonant dispersion. This randomized modulation of the sound input signal 16 "scrambles" the original omnidirectional measurement modes of the acoustic sensor 18. As a result, the measurement modes of each acoustic waveguide 12 are complex in both the spatial and spectral dimensions. Such location-dependent frequency modulation provides both spatial and spectral resolution to the inversion task.

In the embodiment depicted in FIG. 3, the acoustic waveguide 12 is formed from an acoustic metamaterial 14 having a curved receiving surface 14. A frequency and directionality of a sound input 16 received by the metamaterial 14 is encoded as a sound signal 15. The acoustic sensor 18 is operatively coupled (also referred to as acoustically coupled) to the metamaterial 14 and detects the encoded sound signal 15.

In the embodiment shown in FIG. 2, the measurement system 10 includes circuitry 20. The acoustic sensors 18 output a signal based on the detected encoded sound signal 15 that is received by the circuitry 20.

In one embodiment, the acoustic metamaterial 14 encodes the sound input 16 as the encoded sound signal 15 by shifting a property of the sound input 16 based on a location on the acoustic waveguide where the sound input was received. The property altered in the encoded sound signal 15 may be one or more of a frequency, a phase, or an amplitude of the encoded signal 15.

In the embodiment shown in FIG. 3 and as a non-limiting example, a particular sound input 16 having a given frequency is encoded by the acoustic waveguide 12, such that a frequency of the encoded sound signal 15 is shifted from the given frequency by a frequency value dependent on a location 40 of the acoustic waveguide 12 that the particular sound input 16 interacted with the acoustic waveguide 12. For example, if the sound input 16 is a single sound wave having a frequency of 1,000 Hz that interacts with a single location 40 on the acoustic waveguide 12, the encoded sound signal 15 may have a frequency of 950 Hz. This difference (i.e., 50 Hz) in the frequency of the encoded sound signal 15 and the sound input 16 is used to encode the location 40 on the metamaterial 14 that received the sound input 16. If the same sound input 60 (i.e., 1,000 Hz) was received by a different location of the metamaterial 14, the encoded signal 15 would have a different frequency (e.g., 1,050 Hz) depending on properties of the metamaterial 14.

Typical scattering unit cells are used at normal angles of incidence and does not take into account the variation of the wavelength response at oblique angles of incidence. To make sure the wavelength response of the metamaterial 14 of the acoustic waveguide 12 becomes polarization insensitive at normal incidence, symmetrical array elements may be used; however, this is not necessarily the case at oblique angle of incidences (AOIs) because the wavelength response shifts in frequency and becomes polarization dependent. In order to compensate for angle and frequency issues (as well as increase bandwidths), acoustic layers having different density and/or bulk moduli may be used in conjunction with metamaterial unit cells. Metamaterial structures may be modeled over large bandwidths for different AOIs and polarization using finite element modeling (FEM). The scan and wavelength compensations require acoustic layers with higher material properties and when proper layers are used, materials with fewer layers can offer better bandwidths than traditional design.

When using multilayered acoustic materials in the acoustic waveguide 12, the broadband matching of the structure to free space should be done for both normal incidence and oblique incidence. The whole structure of the acoustic waveguide 12 takes care of the wavelength and scan compensations. If a layer must have a certain value of density, bulk modulus, or thickness, the values of other layers can be adjusted to compensate for the deteriorations introduced by the previous perturbation. Slices of the 2π acoustic measurement device may be designed with low-pass elements that help minimize harmonics and anti-resonance problems. The resonating dispersion of each waveguide is contributed to by an array of Helmholtz resonators distributed within the fan-shaped area. Such side branch resonators are commonly used as acoustic filters. The resonating frequency can be estimated through knowledge of the speed of sound, the height of the resonator, as well as the change in height increase due to open aperture-like geometry. This facilitates the design of the acoustic waveguides 12 which can be modeled using lumped elements. Polarizations may be approximated by an equivalent model for the initial design of the acoustic waveguides 12, but then backed up with full-wave solutions as well. Another alternative is through the use of resonating metamaterial elements; but, if resonating metamaterial elements are used, the bandwidth may be limited. However if non-resonant elements may provide the advantages of both metamaterials and larger bandwidths may be realized.

This approach to acoustic waveguide 12 construction using metamaterial 14 is advantageous compared to previous efforts due to two properties: the acoustic performance of an engineered metamaterial structure/metasurface pattern combined with an imaging system across multi-spectral acoustic bands that can obtain the full $2\pi$ BRDF in one capture. Although material layers play an important part in the performance of the structure when oblique AOIs are considered, the relative density and bulk modulus of the material walls may add additional performance metrics. By adjusting the thickness and substrate material properties in terms of geometry and material properties, novel scattering behavior may be realized.

To decode the sound signal 15 detected by the acoustic sensor 18, a sample 17 having known acoustic properties may be placed into the measurement system 10 to calibrate the system 10. As described above, sound may be directed onto the sample 17 or the sample 17 may be caused to emit sound. In either case, the sound input 16 from the sample 17 is received by the acoustic waveguides 12, encoded as a sound signal 15 and detected by the acoustic sensor 18. Because the acoustic properties of the sample 17 are known, a transform may be determined that converts from the signal output by the acoustic sensor 18 to the frequency and directionality of the sound input 16.

The transform may be determined using any suitable signal processing technique including machine learning, Fourier analysis, wavelet processing, etc. Determining the transform may be performed using the circuitry 20 or another computer system. In either case, the circuitry 20 may store the necessary transform(s) for the measuring system 10 in a non-transitory computer readable medium. In the embodiment shown in FIG. 2, the circuitry 20 applies the transform to each of the received output signals to determine the frequency and the directionality of the sound input received by the acoustic waveguide 12 that resulted in the received output signal.

The circuitry 20 may have various implementations. For example, the circuitry 20 may include any suitable device, such as a processor (e.g., CPU), programmable circuit, integrated circuit, memory and I/O circuits, an application specific integrated circuit, microcontroller, complex programmable logic device, other programmable circuits, or the like. The circuitry 20 may also include a non-transitory computer readable medium, such as random access memory (RAM), a read-only memory (ROM), an erasable programmable read-only memory (EPROM or Flash memory), or any other suitable medium. Instructions for performing the method described below may be stored in the non-transitory computer readable medium and executed by the circuitry 20. The circuitry 20 may be communicatively coupled to the computer readable medium and network interface through a system bus, mother board, or using any other suitable structure known in the art.

In one embodiment, the transform to decode between the encoded sound signal 15 and the sound input 16 varies between acoustic waveguides 12, so that different transforms may be determined for each of the acoustic waveguides 12 of the system 10.

The hemispherical sensing system shown in FIG. 2 may be modeled by $b=Ax$ where "b" is a vector form of the measured data (measurement vector); "x" is the object vector to be estimated in the system 10. The measurement matrix "A", which represents the forward model of the measurement system 10, is formed by stacking rows of linear sampling vectors (also known as test functions) at sequentially indexed frequencies. The matrix "A" is randomized by the physical properties of the metamaterials 14 to generate non-correlated information channels for sound wave from different azimuths, elevations, and ranges. The level of randomization of the matrix determines the supported resolution, bandwidth, and the multiplexing capability of the sensing system being used.

Figure 4:
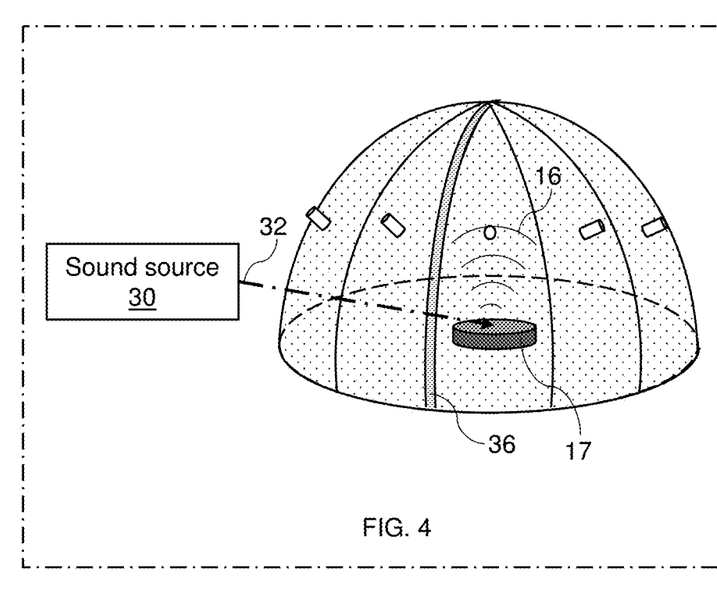
FIG. 4 is a schematic diagram of a measurement system including an external sound source.

FIG. 4 displays a general example of a BRDF measurement system with an external sound source 30. The sound source 30 is positioned outside of the helispherical shape such that sound generated by the sound source 30 interacts with the sample 17 and is received as the sound input 16 by at least one of the acoustic waveguides 12. In the depicted embodiment, the acoustic waveguides 12 are arranged such that at least two neighboring acoustic waveguides 12 are physically separated by an opening 36. The sound source 30 is positioned outside of the hemispherical shape, such that the sound 32 generated by the sound source 30 passes through the opening 36 before interacting with the sample. In one embodiment, the measurement system 10 includes multiple openings 36 and/or multiple sound sources 30.

As opposed to an external sound source, in the embodiment shown in FIG. 2, the acoustic metamaterial 14 is used to generate sound 32, such that the generated sound 32 interacts with the sample 17 and is received as the sound input 16 by the acoustic metamaterial 14. In the embodiment shown in FIG. 5, the sample 17 generates the sound input 16. For example, the sample 17 may be an internal combustion engine or any other source of sound.

Figure 5:
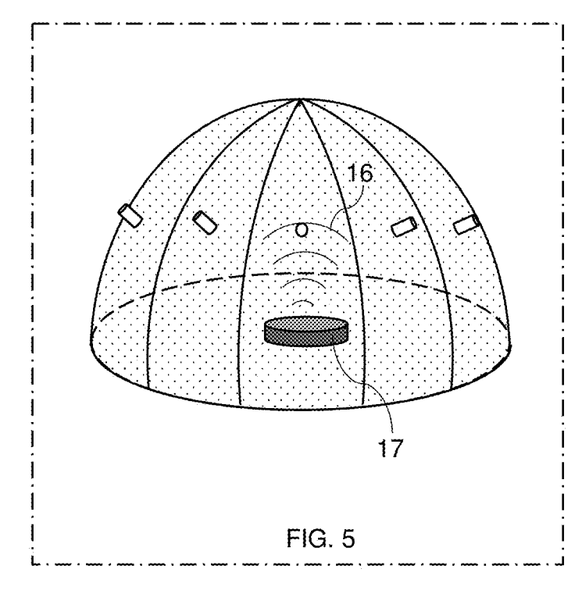
FIG. 5 is a schematic diagram of a measurement system including a sample that generates sound.

In FIGS. 2 and 5, the acoustic waveguides 12 includes at least two sets of neighboring acoustic waveguides 12, each set of neighboring acoustic waveguides 12 including two acoustic waveguides 12 in physical contact with one another. The receiving surface 14 of the acoustic waveguides 12 forms an entirety of the hemispherical shape.

The measurement system 10 may be formed from the acoustic waveguides 12, such that the receiving surfaces 13 of the acoustic waveguides 12 form at least a portion of a hemispherical shape. For example, as opposed to forming a complete hemisphere, the measurement system 10 may cover only a portion of a hemisphere. For example, the single acoustic waveguide 12 shown in FIG. 3 may be used by itself to measure a property of sound coming from a sample 17.

As described, samples having known acoustic properties may be used to calibrate the system 10 to determine a transform for decoding the signal(s) output by the acoustic sensor(s) 18. For example, the sample 17 (also referred to as a coupon) may be designed with subwavelength structures and patterns for novel spatial reflectance properties (i.e. incoming sound provides extremely anisotropic responses out of plane whereby the primary spectral lobe is not radiating along the same direction in the original incidence plane but rather radiating its primary spectral lobe in a plane that is of a different orientation relative to the first), such that a single sample 17 and/or spatial source may be used to calibrate the system 10.

Figure 6:
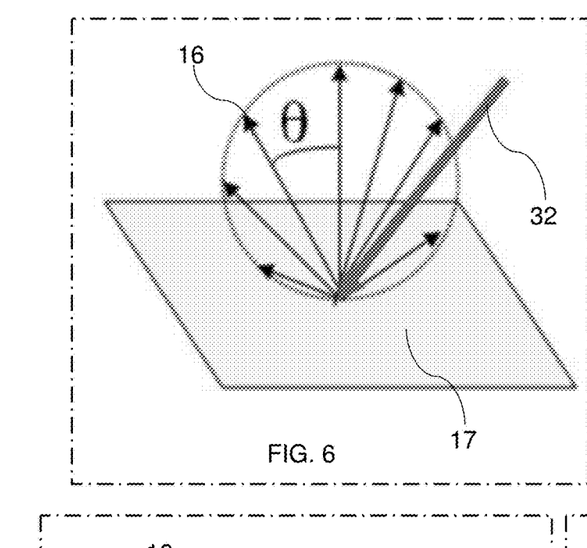
FIG. 6 depicts Lambertian surface reflectance.
Figure 7:
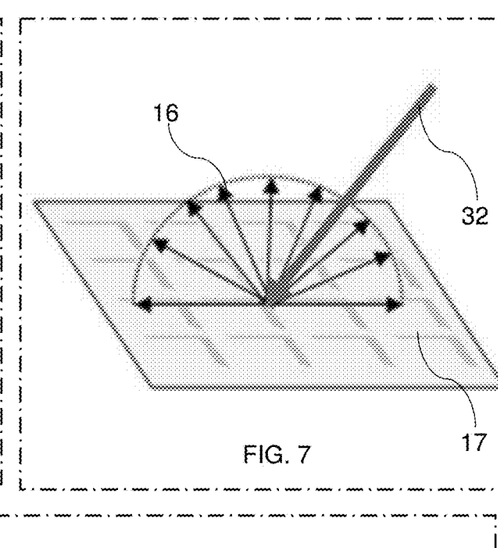
FIG. 7 depicts super Lambertian surface reflectance.

Exemplary samples 17 for use with an external sound source 30 include flat metal or ceramic materials having broadband and highly reflective specular components. However, diffuse-like reflective samples in the long wave acoustic regime are not necessarily the best candidate for extremely diffuse scattering reference samples. For example, a sample 17 may be selected that can reflect diffusely in a Lambertian like pattern evenly across all elevation and azimuthal angle cases for calibration, regardless of incident angle of the incoming radiation as shown in FIGS. 6 and 7. Metamaterials may have such properties if designed properly.

In addition, metasurfaces, which are sub-wavelength structured surfaces, may also allow for the engineering of specific reflection response properties. However, one pattern may not necessarily cover the entire acoustics regime from 20 Hz to 20 kHz. Instead, multiple samples may be needed at different regimes (with overlap) to provide diffuse-like reflectance reference for use across such a large range.

Although there exists different type of reflectance systems, an under-filled sample (also referred to as a coupon) is typically used for BRDF measurements. Under-filling is defined as the irradiation that, when it is intercepted by the sample surface, has a vast majority of its energy inside the physical sample bounds. Typically this is a circular or elliptical beam that has a full beam $1/e^2$ transverse beam profile width that is approximately one-third of the physical distance across the dimension of the sample. This is needed so that a majority of the encircled energy is captured by the coupon for the BRDF measurement. Traditionally this has been used with acoustic horn sources and spectral filters. Although sound sources may be spectrally broad and continuous, their output radiance may not be enough to help induce nonlinear effects in certain samples. More modern sound sources may allow for not only irradiating the surface with a higher flux of energy in a much more targeted manner, but also for novel nonlinear acoustic material effects.

Figure 8:
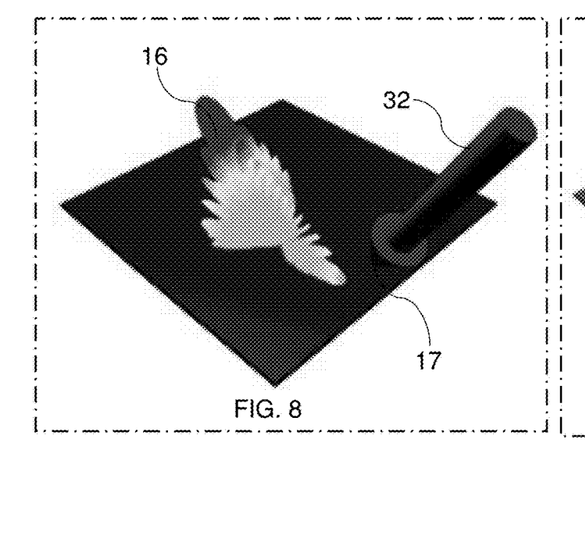
FIG. 8 is an exemplary bidirectional reflectance distribution function (BRDF) of a flat plate having typical specular lobe and weakly diffused side lobe components.
Figure 9:
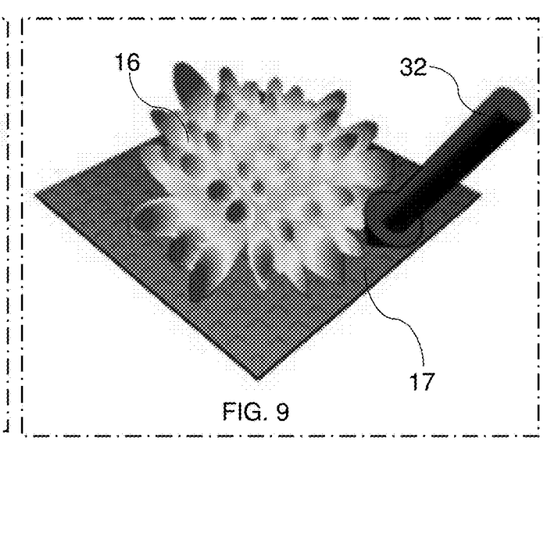
FIG. 9 is an exemplary bidirectional reflectance distribution function (BRDF) of an engineered metamaterial/metasurface that induces preferential omnidirectional scattering via subwavelength structured elements.

Most acoustically flat surfaces will have a specular and diffuse component of its reflection after interacting with the surface to some degree. However, when a sample for calibration is fabricated with the proper unit cell design, scattering may be controlled preferentially in a $2\pi$ steradian angle. This may be accomplished with full wave acoustic solvers coupled with optimization techniques as shown in FIGS. 8 and 9. This is a type of forced/engineered scattering; however, many acoustically advanced metasurfaces and metamaterials may be utilized as a calibration sample to preferentially redirect acoustic scattering.

The design of the acoustic waveguide 12 and the measurement system 10 described may be used to measure large acoustic spectral bandwidth areas in a full BRDF or $2\pi$ measurement that were typically inaccessible due to limited reflectance measurement systems that could have been limited to one plane (e.g. Directional Hemispherical Reflectance that provides reflection versus AOI) versus this newer design (e.g. BRDF, full $2\pi$ steradians).

In certain embodiments, analyzing samples 17 requires advanced scattering measurement techniques capable of high-performance reflectance analysis in a small configuration footprint with little additional complexities to the system. Acoustic Metamaterials with multi-cell plastic and non-plastic layers allow interaction between large frequency bands in a small package and/or a multilayered metamaterial that allows extremely wide oblique Angle of Incidence (AOI) properties in a thin package.

Figure 10:
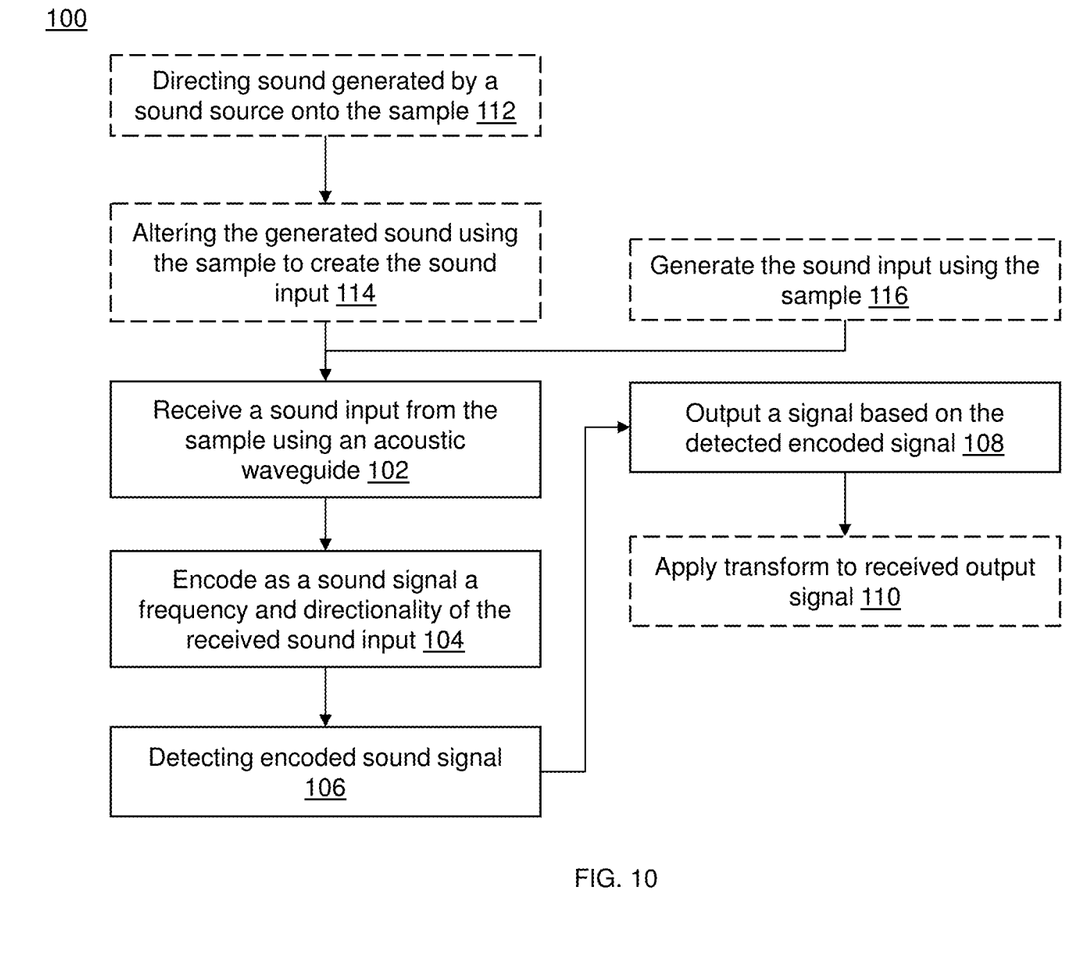
FIG. 10 is a flow diagram depicting a method for measuring BRDF in an acoustic regime.

Turning to FIG. 10, an embodiment of a method 100 for measuring bidirectional reflectance distribution function (BRDF) in an acoustic regime is shown. In processing block 102, a sound input 16 from a sample 17 is received using an acoustic waveguide 12 made from an acoustic metamaterial 14 having a curved receiving surface 13. In process block 104, a frequency and directionality of the received sound input 16 is encoded as a sound signal 15 by the acoustic waveguide 12.

In process block 106, the encoded sound signal 15 is detected using an acoustic sensor 18 that is operatively coupled to the acoustic metamaterial 14. In process block 108, a signal is output from the acoustic sensor 18 based on the detected encoded sound signal 15. In optional process block 110, a transform is applied to the received output signal to determine the frequency and the directionality of the sound input 16 received by the acoustic waveguide 12 that resulted in the received output signal.

In optional process block 112, a sound 32 generated by a sound source 30 is directed onto the sample 17. In optional process block 114, the generated sound 32 is altered by the sample 17 to create the sound input 16 that is received using the acoustic waveguide 12. Alternatively, in optional process block 118, instead of directing sound onto the sample 17, the sample 17 generates the sound input 16.

Figure 11:
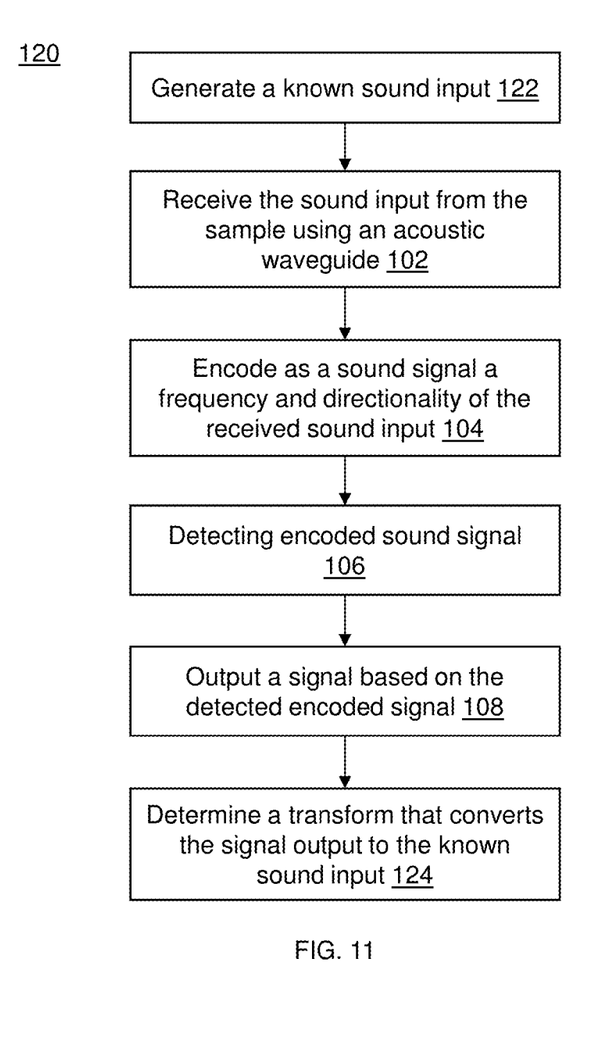
FIG. 11 is a flow diagram depicting a method for generating a transform for decoding a sound output from an acoustic waveguide.

Turning to FIG. 11, an embodiment of a method 120 for generating a transform for decoding a sound output from an acoustic waveguide is shown. In process block 122, a known sound input is generated. Processing of the known sound input is then performed in process blocks 102, 104, 106, and 108 as described above. Following process block 108, the transform is determined that converts the signal output to the known sound input in process block 124.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. An acoustic waveguide comprising:
    an acoustic metamaterial having a curved receiving surface and being configured to encode a frequency and directionality of a sound input received from a sample to produce an encoded sound signal; and
    an acoustic sensor operatively coupled to the acoustic metamaterial and configured to detect the encoded sound signal and output a signal based on the detected encoded sound signal.

2. The acoustic waveguide of claim 1, wherein the acoustic sensor is in physical contact with the acoustic metamaterial.

3. The acoustic waveguide of claim 1,
wherein the acoustic metamaterial encodes the sound input as the encoded sound signal by shifting a property of the sound input based on a location on the acoustic waveguide where the sound input was received; and
wherein the property is at least one of a frequency, a phase, or an amplitude of the encoded signal.

4. The acoustic waveguide of claim 3, wherein the property includes the frequency.

5. The acoustic waveguide of claim 1, wherein the acoustic metamaterial is further configured to generate sound, such that the generated sound interacts with the sample and is received as the sound input by the acoustic metamaterial.

6. The acoustic waveguide of claim 1 in combination with additional acoustic waveguides as part of a measurement system, wherein the acoustic waveguide and the additional acoustic waveguides are arranged, such that the receiving surfaces of the acoustic waveguide and the additional acoustic waveguides form at least a portion of a hemispherical shape.

7. The acoustic waveguide of claim 6, in combination with a sound source positioned outside of the helispherical shape such that sound generated by the sound source interacts with the sample and is received as the sound input by at least one of the acoustic waveguide and the additional acoustic waveguides.

8. The acoustic waveguide of claim 7,
wherein the acoustic waveguide and the additional acoustic waveguides are arranged such that at least two neighboring acoustic waveguides of the acoustic waveguide and the additional acoustic waveguides are physically separated by an opening; and
wherein the sound source is positioned outside of the hemispherical shape, such that the sound generated by the sound source passes through the opening before interacting with the sample.

9. The acoustic waveguide of claim 6, wherein the acoustic waveguide and the additional acoustic waveguides includes at least two sets of neighboring acoustic waveguides, each set of neighboring acoustic waveguides including two acoustic waveguides in physical contact with one another.

10. The acoustic waveguide of claim 6, wherein the receiving surface of the acoustic waveguide and the additional acoustic waveguides form an entirety of the hemispherical shape and the hemispherical shape has at most one opening.

11. The acoustic waveguide of claim 6, further comprising circuitry configured to receive the signal output from the acoustic sensor of each of the acoustic waveguides.

12. The acoustic waveguide of claim 11, wherein the circuitry is further configured to apply a transform to each of the received output signals to determine the frequency and the directionality of the sound input received by the acoustic waveguide that resulted in the received output signal.

13. A measurement system comprising:
a plurality of acoustic waveguides each including:
an acoustic metamaterial having a curved receiving surface and being configured to encode a frequency and directionality of a sound input received from a sample to produce an encoded sound signal; and
an acoustic sensor operatively coupled to the acoustic metamaterial and configured to detect the encoded sound signal and output a signal based on the detected encoded sound signal;
wherein the acoustic waveguides are arranged, such that the receiving surfaces of the plurality of acoustic waveguides form at least a portion of a hemispherical shape.

14. The measurement system of claim 13,
wherein the acoustic metamaterial encodes the sound input as the encoded sound signal by shifting a property of the sound input based on a location on the acoustic waveguide where the sound input was received; and
wherein the property is at least one of a frequency, a phase, or an amplitude of the encoded signal.

15. A method for measuring a bidirectional reflectance distribution function (BRDF), the method comprising:
receiving a sound input from a sample using an acoustic waveguide made from an acoustic metamaterial having a curved receiving surface;
encoding a frequency and directionality of the received sound input as an encoded sound signal by the acoustic waveguide;
detecting the encoded sound signal using an acoustic sensor operatively coupled to the acoustic metamaterial; and
outputting and measuring a signal representative of the BRDF from the acoustic sensor based on the encoded sound signal.

16. The method of claim 15,
wherein the acoustic metamaterial encodes the sound input as the encoded sound signal by shifting a property of the sound input based on a location on the acoustic waveguide where the sound input was received; and
wherein the property is at least one of a frequency, a phase, or an amplitude of the encoded signal.

17. The method of claim 16, wherein the property includes the frequency.

18. The method of claim 15, further comprising applying a transform to the received output signal to determine the frequency and the directionality of the sound input received by the acoustic waveguide that resulted in the received output signal.

19. The method of claim 18, further comprising determining the transform by:
receiving a known sound input having known frequency and directionality; and
determining the transform that converts the signal output to the known sound input.

20. The method of claim 15, further comprising:
directing sound generated by a sound source onto the sample; and
altering the generated sound by the sample to create the sound input that is received using the acoustic waveguide.

* * * * *